United States Patent Office 3,209,053
Patented Sept. 28, 1965

3,209,053
ORGANOSILICON CYCLIC UREA DERIVATIVES
AND COATINGS THEREOF
John W. Gilkey and Robert H. Krahnke, Midland, Mich.,
assignors to Dow Corning Corporation, Midland, Mich.,
a corporation of Michigan
No Drawing. Filed June 4, 1962, Ser. No. 199,613
10 Claims. (Cl. 260—824)

This invention relates to novel cyclic urea derivatives of organosilicon compounds.

It is the object of this invention to prepare novel organosilicon compounds having the cyclic urea structure attached to silicon through a silicon carbon bond which compositions are useful in the preparation of adhesives, laminating resins, sizing agents for glass and as additives in the preparation of durable water repellent finishes on cellulosic fabrics. Other objects and advantages will be apparent from the following description.

This invention relates to organosilicon compounds of the formula $$(R''O)_{3-y}\underset{\underset{\displaystyle O}{\|}}{\overset{R'_y}{\underset{\displaystyle C}{\text{SiRN}}}}\overset{\text{—Z—}}{\underset{\diagdown\ \diagup}{\text{NH}}}$$

in which R'' is selected from the group consisting of alkyl and acyl radicals of from 1 to 4 inclusive carbon atoms and radicals of the formula —$(CH_2CH_2O)_nR'''$ where R''' is an alkyl radical of from 1 to 4 inclusive carbon atoms and $n$ is an integer of from 1 to 2 inclusive, R' is a monovalent hydrocarbon radical of less than 7 carbon atoms, $y$ has an average value of from 0 to 3 inclusive, R is a divalent hydrocarbon radical of from 3 to 18 inclusive carbon atoms which is free of aliphatic unsaturation and in which one N atom of the cyclic urea ring is attached to R through a nonaromatic carbon atom and Z is a divalent hydrocarbon radical selected from the group consisting of

—CDHCDH— and —CDHCDHCDH— in which D is hydrogen or a lower alkyl radical.

The above silanes are best prepared by reacting silanes of the formula $$(R''O)_{3-y}\overset{R'_y}{\underset{|}{\text{SiRNHZNH}_2}}$$

with urea. The reaction occurs upon heating a mixture of the two reactants. If desired, suitable solvents may be employed such as alcohols such as methanol, ethanol or isopropanol; or hydrocarbons such as toluene, xylene and the like. The temperature of the reaction is not critical, although in general, the mixture is heated to 125° C. or above before reaction starts. Reaction can be followed by the evolution of ammonia which is a by-product of the reaction.

Silanes of the formula $$(R''O)_{3-y}\overset{R'_y}{\underset{|}{\text{SiRNHZNH}_2}}$$

are known compounds and can be readily prepared by reacting a silane of the formula $$(R''O)_{3-y}\overset{R'_y}{\underset{|}{\text{SiRCl}}}$$

with a diamine of the formula $NH_2ZNH_2$. It is best to employ a molar excess of the diamine.

This invention also relates to siloxanes containing at least one siloxane unit of the formula $$O_{\frac{3-y}{2}}\underset{\underset{\displaystyle O}{\|}}{\overset{R'_y}{\underset{\displaystyle C}{\text{SiRN}}}}\overset{\text{—Z—}}{\underset{\diagdown\ \diagup}{\text{NH}}}$$

in which $y$ has an average value from 0 to 2 inclusive, R' is a monovalent hydrocarbon radical of less than 7 carbon atoms, R is a divalent hydrocarbon radical of 3 to 18 inclusive carbon atoms which is free of aliphatic unsaturation and in which one N atom of the cyclic urea ring is attached to R through a nonaromatic carbon atom and Z is a divalent hydrocarbon radical of the group consisting of —CDHCDH— and

—CDHCDHCDH— in which D is hydrogen or a lower alkyl radical, any remaining siloxane units being of the unit formula $$B_aSiO_{\frac{4-a}{2}}$$

in which B is selected from the group consisting of monovalent hydrocarbon radicals and monovalent halohydrocarbon radicals of from 1 to 18 inclusive carbonatoms, and hydrogen atoms, and $a$ has an average value of from 1 to 3 inclusive.

The siloxanes of this invention can be prepared by two general methods. The first method is by the hydrolysis of the above described silanes. This hydrolysis can be carried out in the conventional manner employing one of the above described silanes, or any combination thereof to produce either homopolymers or copolymers. In addition, copolymeric siloxanes in which only some of the silicon atoms contain the cyclic urea ring can be prepare by cohydrolyzing the above described silanes with hydrolyzable silanes of the formula $B_aSiX_{4-a}$ in which $a$ and B are as above defined, and X is a hydrolyzable group.

The second general method for preparing the siloxanes of this invention is to react homopolymeric or copolymeric siloxanes containing the substituent $NH_2ZNHSHi\equiv$ on some of all of the silicon atoms with urea in order to form the cyclic urea derivatives. The conditions for this reaction are the same as those for the above described silanes. Thus, it can be seen that the basic reaction involved in preparing the unique organosilicon compounds of this invention can be written schematically as follows:

$$\equiv\text{SiRNHZNH}_2 + NH_2\overset{\overset{\displaystyle O}{\|}}{C}NH_2 \xrightarrow{\text{heat}} \equiv\text{SiRN}\overset{\text{—Z—}}{\underset{\underset{\displaystyle \underset{\displaystyle O}{\|}}{C}}{\diagdown\ \diagup}}NH + 2NH_3$$

For the purpose of this invention R'' can be an alkyl radical such as methyl, ethyl, isopropyl or butyl; an acyl radical such as formyl, acetyl or propionyl; an alkoxyethyl radical such as β-methoxyethyl, β-ethoxyethyl, or β-butoxyethyl; and radicals of the formulas —$(CH_2CH_2O)_2CH_3$ and —$(CH_2CH_2O)_2C_2H_5$ In both the silanes and siloxanes of this invention R' can be any monovalent hydrocarbon radical of less than 7 carbon atoms such as alkyl radicals such as methyl, ethyl, propyl, butyl or hexyl; alkenyl radicals such as vinyl, allyl or hexenyl; cycloaliphatic radicals such as cyclopentyl or cyclohexenyl; and phenyl radicals.

In both the silanes and siloxanes of this invention R can be any divalent hydrocarbon radical of from 3 to 18 inclusive carbon atoms which is free of aliphatic unsaturation and in which the R radical and the cyclic urea ring are linked together by a bond between one of the cyclic urea nitrogen atoms and a nonaromatic carbon atom of R. That is, the carbon atom is not to be part of an aromatic ring. Specific examples of R are

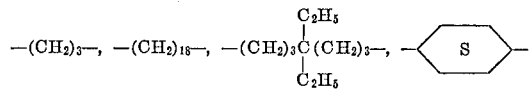

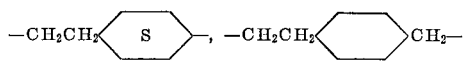

and

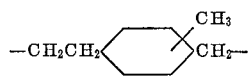

In both the silanes and siloxanes of this invention Z can be either an ethylene or propylene radical, or a substituted ethylene or a substituted propylene radical. Thus, it can be seen that the cyclic urea ring is derived from ethylenediamines and propylenediamines, and that the ring consists of either 5 or 6 atoms. Specific examples of Z are

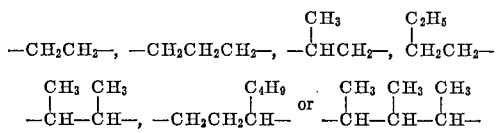

As pointed out above, the siloxanes of this invention can be copolymers containing siloxane units of the structure $$B_aSiO_{\frac{4-a}{2}}$$

in which B can be hydrogen or any monovalent hydrocarbon radical or any monovalent halohydrocarbon radical and $a$ has a value of from 0 to 3 inclusive. Thus, the siloxane units can be of the formula $SiO_2$, $BSiO_{3/2}$, $B_2SiO$, $B_3SiO_{1/2}$. Specific examples of B are any monovalent hydrocarbon radicals such as aliphatic hydrocarbon radicals such as methyl, ethyl, butyl, isobutyl, hexyl, octadecyl, vinyl, allyl, hexenyl, butadienyl and ethynyl; cycloaliphatic hydrocarbon radicals such as cyclopentyl, cyclohexyl, cyclohexenyl and methylcyclohexyl; aromatic hydrocarbon radicals such as phenyl, xenyl, naphthyl, anthracyl, tolyl and xylyl; and aralkyl hydrocarbon radicals such as benzyl, β-phenylethyl or β-phenylpropyl. B can also be any halohydrocarbon radical such as chloromethyl, gamma-chloropropyl, trifluorovinyl chlorocyclohexyl, 3,3,3-trifluoropropyl, α,α,α-trifluorotolyl, pentachlorophenyl, bromoxenyl and iodophenyl.

The silanes and siloxanes described above are useful as sizing agents for siliceous materials for the purpose of increasing the bond strength between the siliceous materials and organic resins. This is particularly true when the resins are aminoplast-formaldehyde resins such as melamine-formaldehyde, urea formaldehyde, triazone formaldehyde and other urea aldehyde resins. The compositions are also useful in forming copolymers with aldehyde aminoplast, particularly formaldehyde-aminoplast resins. These copolymers can be prepared by heating the methylol derivatives of urea, melamine or other amino resins with the cyclic urea organosilicon derivatives of this invention.

The solubility of the methoxysilanes of this invention make them useful in a wide range of solvent systems. For example, these materials can be solubilized in water when added thereto in the presence of a small amount of acetic acid. These water solutions are particularly adaptable for the sizing of siliceous surfaces. Such compositions are particularly adaptable for use as coupling or bonding agents in adhesives, coatings, molding compounds and laminates formed from silicone resins or from formaldehyde-aminoplast resins. The presence of the silanes or siloxanes of this invention impart superior water resistance to such adhesives, coatings and molding compounds. This is particularly useful in the treatment of fabrics and in electrical insulation.

A particularly outstanding use of the compositions of this invention is in the treatment of cellulosic fabrics in order to impart more durable water repellency to the fabric. This is accomplished by applying the cyclic urea organosilicon compounds of this invention to the fabric and thereafter heating the fabric in order to cure the organosilicon compound. The increased durability of the water repellent coating is best realized when the treatment is employed in conjunction with the crease resistance resins employed with cellulosic fabrics. For the purpose of this invention the organosilicon compounds of this invention can be applied to the fabric either combined with, prior to, or subsequent to the crease resistant resin. They can also be applied in any desired manner such as by dipping, spraying or padding, and in any desired form such as solutions, emulsions, etc.

However, optimum results (that is the optimum in durability to laundering) are obtained when the specific compositions hereinafter described are employed with crease resistant resins and the specific siloxanes hereinafter described. Thus, it has been found that particularly good durability is obtained by using (A) a copolymer consisting essentially of from 2 to 50 percent by weight of a siloxane of the unit formula

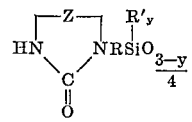

in which $y$ has a value from 0 to 2 inclusive, R′ is a lower alkyl radical, R is a divalent hydrocarbon radical from 3 to 18 inclusive carbon atoms which are free of aliphatic unsaturation and in which one N atom of the cyclic urea ring is attached to R through a nonaromatic carbon atom and Z is a divalent hydrocarbon radical of the group —CDHCDH— and —CDHCDHCDH— in which D is hydrogen or a lower alkyl radical and from 50 to 98 percent by weight of a siloxane of the formula $$(CH_3)_dSiO_{\frac{4-d}{2}}$$

in which $d$ has an average value of from 1.75 to 2.1 inclusive.

These preferred copolymers (A) can be prepared by any of the above methods, but a particularly desirable way of preparing them is by reacting the corresponding alkoxy silanes of the formula

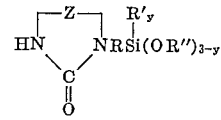

with methylsiloxanes contain silicon-bonded hydroxyl groups. This reaction proceeds best in the presence of a small amount of amine catalyst and the reaction can be represented schematically by the equation:

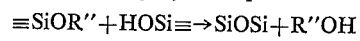

For best results i.e., for the best combination of water repellency and durability, copolymer (A) should be employed in conjunction with at least 5 percent by weight based on the weight of the total siloxane in tthe composition, of (B) a siloxane of the formula $$(CH_3)_bH_cSiO_{\frac{4-b-c}{2}}$$

in which $b$ has an average value of from 1.75 to 2.1 inclusive and $c$ has an average value from 0 to 1 inclusive. The precise upper limit of the amount of the (B) employed can be varied widely except that for best results the amount of the copolymer (A) should be such that there is at least 2 percent by weight of siloxane of the formula

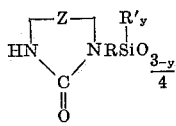

in the combined weight of (A) and (B).

For the purpose of this invention the siloxane (B) can be a homopolymeric dimethylsiloxane or a homopolymeric methylhydrogensiloxane, (B) can also be any copolymer of methylsiloxanes and methylhydrogensiloxanes which fall within the above definition. Examples of such copolymers are a copolymer of monomethylsiloxane, dimethylsiloxane and trimethylsiloxane; a copolymer of trimethylsiloxane and methylhydrogensiloxane; a copolymer of dimethylsiloxane, trimethylsiloxane and $SiO_2$; a copolymer of $HSiO_{3/2}$, dimethylsiloxane and trimethylsiloxane; a copolymer of dimethylsiloxane, $H_2SiO$ and trimethylsiloxane; or a copolymer of $HMe_2SiO_{1/2}$ and methylhydrogen siloxane. Siloxane (B) can also be a mixture of any of these specific siloxanes.

As pointed out above optimum results are obtained when siloxanes (A) and (B) are used in conjunction with a crease resistant resin. Any crease resistant resin which is normally used with cellulosic fabrics can be used. Examples of the types of crease resistant resins which are operative in this invention are urea-formaldehyde resins, alkyleneurea-formaldehyde resins, triazine-formaldehyde resins, triazone-formaldehyde resins, or epoxide resins. The commercial utilization of such resins to render fabrics crease resistant is well established and is described in many publications such as, for example, by Henry Tovey, in "Textile Research Jour.," vol. 31, No. 3, March 1961, pp. 185–252 (printed in U.S.A.).

As is well-known, crease resistant resins for cellulosic fabrics fall into two general types. One type comprises nitrogen compounds having methylol groups attached to the nitrogen. The other type comprises resins containing the epoxide group. Specific examples of the various types shown above are urea-formaldehyde resin of the formula

cyclic alkyleneurea-formaldehyde resins such as dimethylolethyleneurea, dimethylol-1,2-propyleneurea, dimethylol-1,2-propylenethiourea, and dimethylol-1,3-propyleneurea; tri-azone-formaldehyde resins such as dimethylol-5-methyl-tetrahydro-s-triazone-2, and resins of the formula

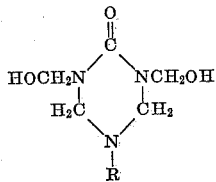

where R is an alkyl group such as methyl, ethyl, propyl, isopropyl, or t-butyl; or a hydroxy alkyl group such as hydroxyethyl or hydroxypropyl; pyrimidone-formaldehyde resins such as

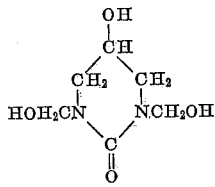

triazine-formaldehyde resins such as monomethylol melamine, dimethylolmelamine, trimethylolmelamine; and alkyl ethers of methylolmelamines such as the monomethylol ether of dimethylolmelamine, the trimethylether of trimethylolmelamine, the monopropylether of trimethylolmelamine, the monobutylether of dimethylolmelamine and ethers of methylolmelamines with dihydric alcohols such as ethylene glycol, propylene glycol, and the like; and epoxide resins such as polyglycidyl ethers of polyhydric alcohols such as the triglycidyl ether of glycerol, the diglycidylether of ethylene glycol, the diglycidyl ether of diethylene glycol, the diglycidyl ether of dipropylene glycol and the diglycidyl ether of hexylene glycol.

The above resins can be employed either alone or in combination. That is one can employ a mixture of a triazone and an urea-formaldehyde resin, or a mixture of an alkylene urea-formaldehyde resin and a triazone-formaldehyde resin. In addition, the resins can be either monomeric, dimeric or polymeric in structure. For best performance the resin should be water-soluble.

The water repellency of the fabrics treated with the compositions of this invention, is maintained after repeated washings in water ranging up to 212° F. Furthermore, the compositions of this invention are not deleteriously affected by catalysts normally employed in curing crease resistant resins. These include amine hydrochlorides, Zn nitrate and zinc fluoroborate. Therefore emulsions containing siloxanes of this invention and crease resistant resins are stable during application in the mill and are less likely to break in the presence of crease resistant resin catalyst than emulsions of the various silicone water repellents heretofore known.

The spray rating of the treated fabric shown in the examples was determined by AATCC standard test No. 22, 1961. The water absorption and water penetration were measured by the Bundesmann test as described in the Tentative Textile Specification No. 8 of 1955 of the British Standards Institute. The wrinkle recovery angle, which is a measure of the crease resistance of a treated fabric, was determined in accordance with AATCC tentative test method No. 66, 1959T.

The following examples are illustrative only and should not be construed as limiting the invention which is properly delineated in the appended claims. In the examples the abbreviations Me, Et and Ph are used for the methyl, ethyl and phenyl radicals respectively.

EXAMPLE 1

27.6 g. of urea and 80 g. of

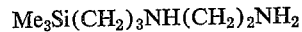

were mixed and heated with stirring. The evolution of ammonia began when the temperature reached 129° C. and the temperature was allowed to rise rapidly to 181° C. and then maintained at that temperature for 4 hours. There was obtained a white clear material which was easily purified by recrystallization from heptane. The material was soluble in water, toluene, methanol, ethanol and isopropanol. It had the formula

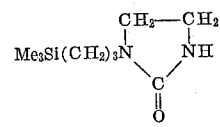

EXAMPLE 2

A mixture of 17.3 g. of urea and 55 g. of

was heated with stirring. Nitrogen was passed through the apparatus during the heating. Ammonia evolution began about 130° C. The pot temperature was allowed to rise to 175° C. in one hour and heating was continued at this temperature for 5 hours. The product was a slightly viscous, light yellow fluid having the formula $$(MeO)_2\overset{Me}{\underset{|}{Si}}CH_2\overset{Me}{\underset{|}{CH}}CH_2\underset{\diagdown}{\overset{\diagup}{N}}\underset{\underset{\overset{\|}{O}}{C}}{\overset{CH_2—CH_2}{}}NH$$

EXAMPLE 3

A mixture of 28 g. of urea and 100 g. of $$(MeO)_3Si(CH_2)_3NH(CH_2)_2NH_2$$

were heated with stirring. The evolution of ammonia began at 129° C. and the temperature of the mixture was allowed to rise to 165° C. Heating was continued for 7 hours at this temperature. The product was a yellow fluid soluble in water, toluene and ethanol and having the formula $$(MeO)_3Si(CH_2)_3\underset{\diagdown}{\overset{\diagup}{N}}\underset{\underset{\overset{\|}{O}}{C}}{\overset{CH_2—CH_2}{}}NH$$

EXAMPLE 4

70 g. of $$[NH_2(CH_2)_2NHCH_2\overset{Me}{\underset{|}{CH}}CH_2\overset{Me_2}{\underset{|}{Si}}]_2O$$

and 22.6 g. of urea were heated at 130° C. for 24 hours and then at 155° C. for 20 hours. The resulting product was a viscous amber fluid soluble in ethanol and toluene and insoluble in water. After some time at room temperature the product solidified to a hard waxy solid. The composition had the formula $$\left[\underset{\underset{\overset{\|}{O}}{C}}{\overset{CH_2—CH_2}{HN}}N CH_2\overset{Me}{\underset{|}{CH}}CH_2\overset{Me_2}{\underset{|}{Si}}\right]_2O$$

EXAMPLE 5

60 g. of a hydroxyl endblocked dimethylsiloxane fluid having an average of about 10 silicon atoms per molecule was mixed with 7.5 g. of $$(MeO)_2\overset{Me}{\underset{|}{Si}}CH_2\overset{Me}{\underset{|}{CH}}CH_2NH(CH_2)_2NH_2$$

The compoents were stirred as a slow flow of nitrogen was passed through the system. After two hours a mixture of 50 ml. of toluene and 2.40 g. of urea were added and the heating started. Distillation of methanol and toluene began after 17 minutes at a pot temperature of 115° C. The temperature was raised to 135° C. over a one hour period and the evolution of ammonia began. Heating was continued and the temperature rose to 220° C. during 73 minutes. The product was then allowed to cool and a clear colorless viscous liquid was obtained. This material had the average formula $$[H(O\overset{Me_2}{\underset{|}{Si}})_{10}]_2\overset{Me}{\underset{|}{Si}}CH_2\overset{Me}{\underset{|}{CH}}CH_2\underset{\diagdown}{\overset{\diagup}{N}}\underset{\underset{\overset{\|}{O}}{C}}{\overset{CH_2—CH_2}{}}NH$$

EXAMPLE 6

880 g. of $(MeO)_3Si(CH_2)_3NH(CH_2)_2NH_2$ was heated to 190° C. in a nitrogen atmosphere. A solution of 254.4 g. of urea in 2145.6 ml. of methanol was added at a rate to maintain the temperature of the mixture at 185° C. This required 7 hours. The heat was reduced to maintain the temperature at 185° to 190° C. until the temperature of the distilling vapors became constant at 33° C. The product was an amber fluid, soluble in water, toluene and ethanol and had the formula $$(MeO)_3Si(CH_2)_3\underset{\diagdown}{\overset{\diagup}{N}}\underset{\underset{\overset{\|}{O}}{C}}{\overset{CH_2—CH_2}{}}NH$$

EXAMPLE 7

117 parts by weight of a hydroxyl endblocked dimethylpolysiloxane containing an average of about 12 silicon atoms per molecule was mixed with 10 parts by weight of the product of Example 6 and the mixture was allowed to react for 2 hours to produce a copolymer having the average formula $$[H(O\overset{Me_2}{\underset{|}{Si}})_{12}O]_3Si(CH_2)_3\underset{\diagdown}{\overset{\diagup}{N}}\underset{\underset{\overset{\|}{O}}{C}}{\overset{CH_2—CH_2}{}}NH$$

The utility of some of the compositions of this invention to improve the water repellency of fabrics when used in conjunction with crease resistant resins is shown in Examples 8 through 15.

EXAMPLE 8

An emulsion (1) was prepared containing 24 percent by weight of a trimethyl-endblocked methyl hydrogen polysiloxane having a viscosity of about 25 cs. at 25° C., 16 percent by weight of a copolymer of 8.3 percent by weight $$HN\underset{\underset{\overset{\|}{O}}{C}}{\overset{CH_2—CH_2}{}}N(CH_2)_3SiO_{3/2}$$

and 91.7 percent by weight dimethylsiloxane, 21.5 percent by weight polyvinyl alcohol emulsifier and 38.5 percent water. This emulsion was made by mixing the ingredients in a homogenizer.

I. 3.75 g. of ethylene urea-formaldehyde resin, 38.57 g. of water, 1.12 g. of a 50 percent solution of zinc nitrate in water, .47 g. of an emulsion containing 4 percent by weight dibutyl tin diacetate and 18.2 percent by weight zinc octoate and 2.34 g. of emulsion (1) were mixed in the order listed and stirred after the addition of each ingredient. The resulting emulsion was applied to cotton cloth on a 3-roll Butterworth laboratory padder to give about 80 percent by weight emulsion pickup. The treated fabric was air dried and oven cured two minutes at 350° F. The resulting fabric contained about 1 to 1.5 percent by weight total organosiloxane based on the weight of the fabric. The treated fabrics were then washed 40 minutes with water at a temperature of 212° F. in a Najort washing machine. In each case the fabric was washed 40 minutes with soap and soda ash and then given 4 hot rinses with 120° F. water and finally given one cold rinse. In each a polyphosphate water softener was used. These washes were repeated three times on each sample. The spray rating, water absorption and water penetration was determined on the samples before washing and after each washing.

II. The above procedure was repeated except that in lieu of the trimethyl-endblocked methyl hydrogen polysiloxane a hydroxyl endblocked dimethylpolysiloxane of about 4000 cs. viscosity at 25° C. was employed. The results are shown in the table below.

In the table the numbers 0, 1, 2 and 3 show the number of washings to which the fabric had been subjected prior to testing.

Table 1

| Formulation | Spray rating | | | | Percent absorption of water | | | | Ml. of water penetrating fabric | | | |
|---|---|---|---|---|---|---|---|---|---|---|---|---|
| | 0 | 1 | 3 | 3 | 0 | 1 | 2 | 3 | 0 | 1 | 2 | 3 |
| I | 100 | 80 | 70 | 70 | 4.4 | 37 | 44 | 51 | 8 | 15 | 23 | 24 |
| II | 90 | 80 | 70 | 70 | 23 | 30 | 36 | 44 | 8 | 12 | 17 | 26 |
| Blank* | 100 | 0 | 0 | 0 | 3.1 | 75 | 84 | 114 | 8 | 51 | 51 | 59 |

*Commercial silicone water repellent.

EXAMPLE 9

An emulsion (1) was prepared by emulsifying 20 g. of a mixture of (A) 40 percent by weight of a copolymer of 8.2 percent by weight siloxane of the unit formula

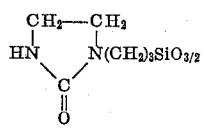

and 91.8 percent by weight dimethylsiloxane and (B) 60 percent by weight of a hydroxyl endblocked dimethylsiloxane fluid; 3 g. of a mixture of 75 percent by weight toluene and 25 percent by weight perchloroethylene; 10 g. of a polyvinyl alcohol emulsifier and 17 g. water. The emulsification was carried out in a homogenizer.

I. 6.3 g. of emulsion (1) was mixed with 7.5 g. of ethyleneurea-formaldehyde crease resistant resin, 2.2 g. of a solution containing 50 percent by weight $$Zn(NO_3)_2 \cdot 6H_2O$$

and 5 percent by weight acetic acid, 3.4 g. of a siloxane catalyst emulsion containing 4 percent by weight dibutyltin diacetate and 18.2 percent by weight zinc octoate, and sufficient water to bring the total weight of I to 100 g. The resulting emulsion was employed to treat cotton fabric. The fabric was saturated with the emulsion, then air dried and cured two minutes at 350° F. Each fabric was then subjected to the wash described in Example 8 except that the temperature of the wash water was 160° F. and no soda ash was used. The spray rating, percent absorption and moisture penetration were determined on each fabric before washing and after each wash. The results are shown in the table below.

II. The above experiment was repeated except that the silicone in emulsion (1) was a mixture of (A) 40 percent by weight of a copolymer of 8.2 percent by weight

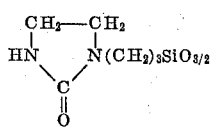

and 91.8 percent by weight dimethylsiloxane and (B) 60 percent by weight of a hydroxyl endblocked 3,3,3-trifluoropropylmethylsiloxane fluid of 16,200 cs. viscosity.

III. The above experiments were repeated except that the siloxane in emulsion (1) was a mixture of (A) 40 percent by weight of a copolymer of 8.2 percent by weight

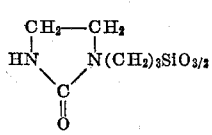

and 91.8 percent by weight dimethylsiloxane and (B) 60 percent by weight of a trimethylsilyl-endblocked propylmethylsiloxane fluid.

Table II

| Siloxane employed | Spray rating | | | Percent absorption | | | Ml. of penetration | | |
|---|---|---|---|---|---|---|---|---|---|
| | 0 | 1 | 3 | 0 | 1 | 3 | 0 | 1 | 3 |
| I | 90 | 80+ | 80 | 29 | 37 | 47 | 7 | 15 | 20 |
| II | 70 | 80 | 70 | 45 | 43 | 56 | 14 | 18 | 21 |
| III | 80 | 70 | 70- | 37 | 50 | 57 | 10 | 20 | 18 |

EXAMPLE 10

An emulsion (1) was prepared by emulsifying a mixture of 20 g. of a mixture of (A) 40 percent by weight of a copolymer of 8.2 percent by weight

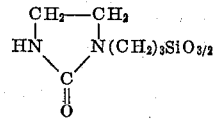

and 91.8 percent by weight dimethylsiloxane and (B) 60 percent by weight of a fluid trimethylsilyl endblocked methylhydrogensiloxane; 3 g. of a mixture of 75 percent by weight toluene and 25 percent by weight perchloroethylene; 10 g. of polyvinyl alcohol emulsifier and 17 g. water.

The above emulsion was mixed with ethylene urea-formaldehyde resin in the amounts shown in the table below. In each case the mixture contained 6.3 g. of the silicone emulsion (1), 1.1 g. of zinc nitrate, 3.4 g. of a siloxane catalyst emulsion containing 4 percent by weight dibutyltindiacetate and 18.2 percent by weight zinc octoate; and sufficient water to bring the weight of the mixture to 100 g.

The compositions containing each concentration of the ethylene urea-formaldehyde resin were applied to cotton fabric and washed as shown in the Example 9 and the resulting spray rating, absorption and penetration are shown in the table below.

Table III

| Ethylene urea resin conc. based on total wt. of silicone and resin in the emulsion | Wrinkle recovery angle | Spray percent rating absorption | | | | Ml. of penetration | |
|---|---|---|---|---|---|---|---|
| | | 0 | 5 | 0 | 5 | 0 | 5 |
| 80% | 159 | 100 | 50 | 3 | 73 | 6 | 29 |
| 28.5% | 111 | 100 | 50 | 6 | 112 | 6 | 45 |
| 2.8% | 102 | 100 | 0 | 10 | 130 | 8 | 49 |
| No resin | 100 | 100 | 0 | 89 | 127 | 7 | 48 |

EXAMPLE 11

An emulsion (1) was prepared by emulsifying 18 percent by weight of a trimethyl-endblocked methyl hydrogen polysiloxane; 12 percent by weight of a copolymer of 91 percent by weight dimethylsiloxane and 9 percent by weight

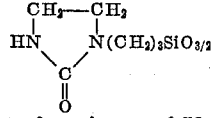

4 percent by weight of a mixture of 72 percent by weight toluene and 28 percent perchloroethylene; 2 percent by weight of the tridecyl alcohol ether of ethyleneoxide, 0.1 percent by weight glacial acetic acid and 63.9 percent water.

The above emulsion was employed in conjunction with various crease-resistant resins as shown below. In each case the formulation used was 6.28 percent by weight silicone emulsion (1), 5 percent by weight crease-resistant resin, 0.36 percent by weight of an emulsion containing 25 percent by weight octylene glycol titanate, 1.5 percent by weight of a 50 percent aqueous solution of zinc nitrate and 86.59 percent by weight water.

Samples of cotton fabric were immersed in each of the compositions and padded at 40 pound pressure on pad-rolls. The samples were then air-dried and heated 1.5 minutes at 350° F. The spray rating of each sample was determined and the samples were given three washings at 160° F. in the Najort washing machine. The results are shown in the table below:

*Table IV*

| Type of crease-resistant resin | Spray rating | | |
|---|---|---|---|
| | 0 | 1 | 3 |
| Dimethylol melamine | 100 | 70+ | 70 |
| Butyl ether of methylol melamine | 100 | 70 | 70 |
| Dimethylol triazone | 100 | 70+ | 70 |

EXAMPLE 12

A series of emulsions were prepared by mixing 7.5 g. of ethylene urea-formaldehyde resin; 1.86 g. of a mixture of 40 percent by weight of (A) a copolymer of $$HN\underset{\underset{O}{\overset{\|}{C}}}{\overset{CH_2—CH_2}{\diagup\diagdown}}N(CH_2)_3SiO_{3/2}$$

and dimethylsiloxane, and 60 percent by weight of (B) a trimethyl-endblocked methyl hydrogenpolysiloxane; 0.6 g. of an emulsion containing 4 percent by weight dibutyltin diacetate and 18 percent by weight zinc octoate, .1 g. of polyvinyl alcohol, 1.1 g. of zinc nitrate and 88.84 g. of water. Each composition was identical except that the weight ratio of $$HN\underset{\underset{O}{\overset{\|}{C}}}{\overset{CH_2—CH_2}{\diagup\diagdown}}N(CH_2)_3SiO_{3/2}$$

(silicone cyclic urea) was varied as shown in the table below. Each emulsion was employed to treat cotton fabric as in Example 11 and the spray rating was determined after 160° F. washings as shown below:

*Table V*

| Percent by wt. silicone cyclic urea based on total wt. of (A) | Percent by wt. silicone cyclic urea based on total wt. of (A) and (B) | Spray rating | | | |
|---|---|---|---|---|---|
| | | 0 | 1 | 3 | 5 |
| 28.5 | 14.1 | 100 | 80 | 80 | 70 |
| 19.8 | 8.6 | 100 | 80 | 70 | 70— |
| 10 | 4.8 | 100 | 80 | 70 | 50 |
| 6.8 | 3.3 | 100 | 80 | 70 | 50 |
| 2 | 1.1 | 100 | 80 | 50 | 0 |

EXAMPLE 13

An emulsion (1) was prepared consisting of 18 percent by weight fluid trimethyl-endblocked methyl hydrogen polysiloxane; 12 percent by weight of a copolymer of 91 percent by weight of dimethylsiloxane and 9 percent by weight of $$O_{3/2}Si(CH_2)_3N\underset{\underset{O}{\overset{\|}{C}}}{\overset{CH_2—CH_2}{\diagup\diagdown}}NH$$

4 percent by weight of a mixture of 72 percent by weight of toluene and 28 percent by weight perchloroethylene; 2 percent by weight of the tridecyl alcohol ether of ethyleneoxide; .1 percent by weight of glacial acetic acid; and 63.9 percent water.

5 g. of emulsion (1) was mixed with 20 g. of a 5 percent solution of polyvinyl alcohol in water, 20 g. of the epoxide crease-resistant resin of the formula $$\underset{CH_2}{\overset{O}{\diagup\diagdown}}CHCH_2OCH_2CH_2OCH_2\underset{CH_2}{\overset{O}{CH—\diagdown\diagup}}$$

80 g. of water, 3.4 g. of a 40 percent aqueous solution of Zn(BF₃)₄·6H₂O and 1 g. of an emulsion containing 1.6 percent by weight dibutyltindiacetate and 18 percent by weight zinc octoate.

Cotton fabric was treated with the above emulsion and the resulting fabric was cured and subjected to 160° F. washes. The wrinkle recovery angle and spray rating were determined. The results were as follows:

Wrinkle recovery angle _____ 251°
Spray rating, 0 washes _____ 100
After one wash _____ 80
After three washes _____ 70
After five washes _____ 70—

EXAMPLE 14

Excellent water repellency is obtained when the following siloxane copolymers are substituted for siloxane (A) in formulation I in the procedure of Example 9.

(1) 20% by weight $HN\underset{\underset{O}{\overset{\|}{C}}}{\overset{CH_2—CH_2}{\diagup\diagdown}}NCH_2\overset{Me}{\underset{}{CH}}CH_2\overset{Me}{\underset{}{Si}}O$ 80% by weight dimethylsiloxane (2) 30% by weight $HN\underset{\underset{O}{\overset{\|}{C}}}{\overset{CH_2CH_2\;CH_2}{\diagup\diagdown}}N(CH_2)_{18}\overset{Me_2}{Si}O_{.5}$ 70% by weight dimethylsiloxane (3) 10% by weight $HN\underset{\underset{O}{\overset{\|}{C}}}{\overset{CH_2\quad CH}{\diagup\diagdown}}NCH_2\bigcirc CH_2CH_2\overset{Et}{\underset{}{Si}}O$ 90% by weight Me₁.₆SiO₁.₁

(4) 40% by weight $N\underset{\underset{O}{\overset{\|}{C}}}{\overset{\overset{Me}{CH}—\overset{Me}{CH}}{\diagup\diagdown}}N\langle S\rangle SiO_{3/2}$ 60% by weight dimethylsiloxane (5) 10% by weight $HN\underset{\underset{O}{\overset{\|}{C}}}{\overset{CH_2—CH_2}{\diagup\diagdown}}N\langle S\rangle CH_2CH_2\overset{C_4H_9}{\underset{}{Si}}O$ 90% by weight dimethylsiloxane

EXAMPLE 15

This example shows treating the fabric with the silicone cyclic urea before treating with the crease resistant resin.

3,209,053

(1)

(A) .25 g. of a 25% by weight aqueous solution of

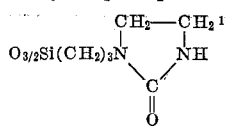[1]

was added to 99.75 g. of water.

Cotton cloth was impregnated with this solution and the fabric was then air dried and heated 2 minutes at 350° F.

(B) The cotton cloth was then treated with a mixture of 4.7 g. of a 40 percent by weight emulsion of a mixture of 40 percent by weight of a hydroxyl endblocked dimethylpolysiloxane fluid and 60 percent by weight of a trimethylsiloxy-endblocked methylhydrogenpolysiloxane fluid; 7.5 g. of ethyleneurea-formaldehyde resin; 1.1 g. zinc nitrate; .6 g. of an emulsion containing 4 percent by weight dibutyltin-diacetate and 18 percent by weight zinc octoate and sufficient water to make the total composition weight 100 g. The cloth was air dried and heated 2 minutes at 350° F. The spray rating was determined after curing and after washing at 160° F. as shown in the table below.

(2)

The above procedure was repeated except that

---
[1] This material contained silicon-bonded hydroxyl groups.

(A) was made by adding 1.88 g. of a 40 percent by weight emulsion of a copolymer of 8.2 percent by weight of

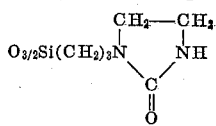

and 91.8 percent by weight dimethylsiloxane to 98.12 g. of water (B) was a mixture of 2.8 g. of a 40 percent by weight emulsion of a trimethylsilyl-endblocked methylhydrogenpolysiloxane fluid; 7.5 g. of ethyleneurea-formaldehyde resin, 1.1 g. zinc nitrate; .6 g. of an emulsion of 4 percent dibutyltindiacetate, and 18 percent by weight zinc octoate and sufficient water to bring (B) to 100 g. of weight.

| Treatment | Spray rating | | | |
|---|---|---|---|---|
| | 0 | 1 | 3 | 5 |
| 1 | 100 | 80 | 70 | 50 |
| 2 | 100 | 90 | 70 | 50 |

EXAMPLE 16

When the following silanes are reacted with urea in accordance with the procedure of Example 1, the following cyclic urea silanes are obtained:

| Silane | Cyclic urea silane |
|---|---|
| H₂NCH₂CH₂CH₂NH–⟨S⟩–Si(OCMe)₂ with Ph and O=C | Cyclic urea derivative with CH₂CH₂CH₂ bridge, Ph, S, Si(OCMe)₂ |
| H₂NCH–CHNH(CH₂)₁₈Si(OEt)₂ with Me, Me, CH=CH₂ | Cyclic urea with Me, Me, CH=CH₂, (CH₂)₁₈Si(OEt)₂ |
| H₂NCH₂CHNHCH₂CH₂–⟨ ⟩–CH₂CH₂Si(OCH)₃ with Et, O | Cyclic urea with Et, CH₂CH₂–⟨ ⟩–CH₂CH₂Si(OCH)₃ |
| H₂NCH₂CH₂NH(CH₂)₃Si(OC₄H₉)₃ | Cyclic urea with (CH₂)₃Si(OC₄H₉)₃ |
| H₂NCH₂CH₂NH(CH₂)₃SiOMe with Me₂ | Cyclic urea with (CH₂)₃SiOMe, Me₂ |
| H₂NCH₂CH₂NH(CH₂)₃Si(OCH₂CH₂OMe)₃ | Cyclic urea with (CH₂)₃Si(OCH₂CH₂OMe)₃ |

| Silane | Cyclic urea silane |
|---|---|
| H₂NCH₂CH₂NH(CH₂)₃Si[O(CH₂CH₂O)₂C₄H₉]₃ | 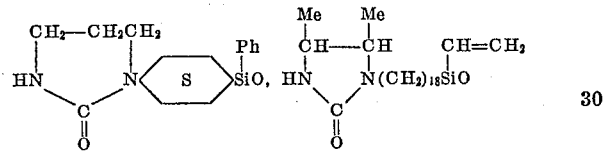 |
| H₂NCH₂CH₂NH(CH₂)₃Si(OC(O)Et)₃ | 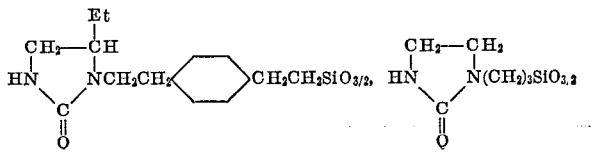 |

EXAMPLE 17

When the cyclic urea silanes of Example 15 are hydrolyzed and condensed the siloxanes of the following unit formulae are obtained.

and

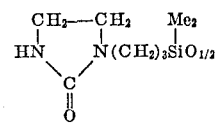

EXAMPLE 18

When the following siloxanes are reacted with urea in accordance with the procedure of Example 4, the following products are obtained. In those cases where the siloxane is too viscous at reaction temperature, toluene is used as a solvent.

| | |
|---|---|
| [H₂NCH₂CH₂NH(CH₂)₃SiO]₄Si | [cyclic urea analog]₄Si |
| [H₂NCH₂CH₂NH(CH₂)₃SiO]₃SiC₁₈H₃₇ | [cyclic urea analog]₃SiC₁₈H₃₇ |
| H₂NCH₂CH₂NH(CH₂)₃SiO(SiO)₈SiMe₃ (with Ph and S ring) | cyclic urea analog with Ph and S ring |
| Copolymer of: | Copolymer of: |
| 10 mol percent Et₂SiO | 10 mol percent Et₂SiO |
| 20 mol percent ClC₆H₄SiO₃/₂ | 20 mol percent ClC₆H₄SiO₃/₂ |
| 20 mol percent CF₃C₆H₄SiO (Me) | 20 mol percent CF₃C₆H₄SiO (Me) |
| 50 mol percent H₂N(CH₂)₂NH(CH₂)₃SiO₃/₂ | 50 mol percent cyclic urea silyl SiO₃/₂ |

| Copolymer of: | Copolymer of: |
|---|---|
| 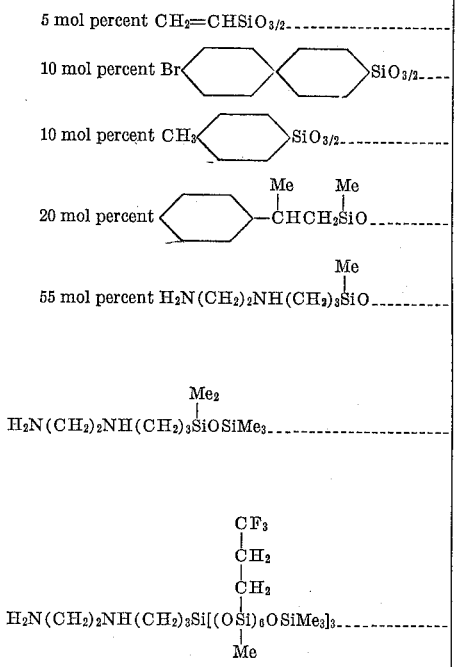 | 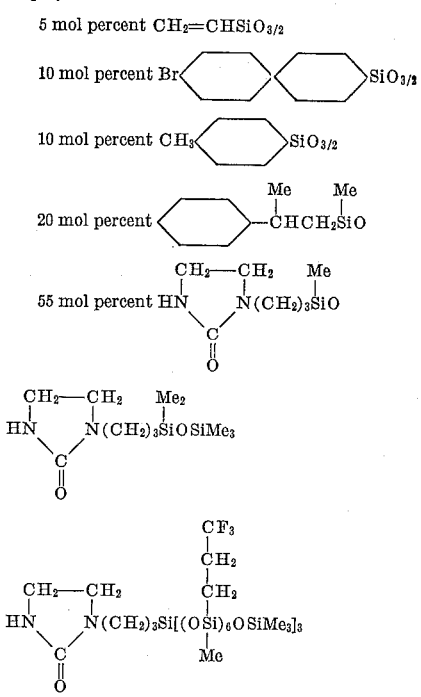 |

EXAMPLE 19

When the following silanes are cohydrolyzed in the amounts indicated with one mol of

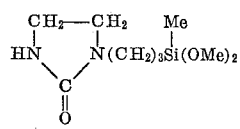

in an aqueous medium containing .1 percent by weight acetic acid the following siloxanes are obtained.

That which is claimed is:
1. A composition of the formula

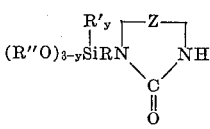

in which
R″ is selected from the group consisting of alkyl and acyl radicals of from 1 to 4 inclusive carbon atoms

| Amount | Silane | Siloxane copolymer |
|---|---|---|
| 99 mols | ClCH₂CH₂CH₂Si(OMe)₂ with Me | 1 mol percent of cyclic urea silicone structure; 99 mol percent ClCH₂CH₂CH₂SiO with Me |
| 1000 mols | Cl-phenyl(S)-Si(OMe)₂ with Me | .1 mol percent cyclic urea silicone; 99.9 mol percent Cl-phenyl(S)-SiO with Me |
| 99 mols | MeSi(OMe)₂ with H | 99 mol percent MeHSiO; 1 mol percent cyclic urea silicone | and radicals of the formula $-(CH_2CH_2O)_nR'''$ where

R''' is an alkyl radical of from 1 to 4 inclusive carbon atoms, and n is an integer from 1 to 2 inclusive, R' is a monovalent hydrocarbon radical of less than 7 carbon atoms, y has an average value from 0 to 3 inclusive, R is a divalent hydrocarbon radical of from 3 to 18 inclusive carbon atoms which is free of aliphatic unsaturation and in which one N atom of the cyclic urea ring is attached to R through a nonaromatic carbon atom, and Z is a divalent hydrocarbon radical selected from the group consisting of $-CDHCDH-$ and $$-CDHCDHCDH-,$$

in which D is selected from the group consisting of hydrogen atoms and lower alkyl radicals.

2. A composition of the formula $$(CH_3O)_3Si(CH_2)_3N\underset{\underset{O}{\overset{\|}{C}}}{\overset{CH_2-CH_2}{\diagdown\diagup}}NH$$

3. A composition of the formula $$(CH_3O)_2\underset{CH_3}{\overset{|}{Si}}(CH_2)_3N\underset{\underset{O}{\overset{\|}{C}}}{\overset{CH_2-CH_2}{\diagdown\diagup}}NH$$

4. A siloxane containing at least one siloxane unit of the formula $$O_{\frac{3-y}{2}}SiR\underset{}{\overset{R'_y}{|}}N\underset{\underset{O}{\overset{\|}{C}}}{\overset{-Z-}{\diagdown\diagup}}NH$$

in which y has an average value from 0 to 2 inclusive,

R' is a monovalent hydrocarbon radical of less than 7 carbon atoms,

R is a divalent hydrocarbon radical of 3 to 18 inclusive carbon atoms which is free of aliphatic unsaturation, and in which one N atom of the cyclic urea ring is attached to R through a nonaromatic carbon atom, and Z is a divalent hydrocarbon radical selected from the group consisting of $-CDHCDH-$ and $$-CDHCDHCDH-$$

radicals in which D is selected from the group consisting of hydrogen, and lower alkyl radicals, any remaining siloxane units in said siloxane being of the unit formula $$B_aSiO_{\frac{4-a}{2}}$$

in which

B is selected from the group consisting of hydrogen atoms, monovalent hydrocarbon radicals and monovalent halohydrocarbon radicals, both being from 1 to 18 inclusive carbon atoms, and a has a value from 0 to 3 inclusive.

5. A siloxane of the formula $$HN\underset{\underset{O}{\overset{\|}{C}}}{\overset{CH_2-CH_2}{\diagdown\diagup}}NCH_2CHCH_2\underset{CH_3}{\overset{(CH_3)_2}{\underset{|}{Si}}}-O-\underset{CH_3}{\overset{(CH_3)_2}{\underset{|}{Si}}}CH_2-CHCH_2N\underset{\underset{O}{\overset{\|}{C}}}{\overset{CH_2-CH_2}{\diagdown\diagup}}NH$$

6. A copolymer consisting of from 2 to 50 percent by weight of siloxane of the unit formula $$HN\underset{\underset{O}{\overset{\|}{C}}}{\overset{-Z-}{\diagdown\diagup}}NRSiO_{\frac{3-y}{4}}\overset{R'_y}{\underset{|}{}}$$

in which y has a value from 0 to 2 inclusive,

R' is a lower alkyl radical,

R is a divalent hydrocarbon radical of 3 to 18 inclusive carbon atoms which is free of aliphatic unsaturation and in which one N atom of the cyclic urea ring is attached to R through a nonaromatic carbon atom and Z is a divalent radical selected from the group consisting of $-CDHCDH-$ and $-CDHCDHCDH-$ in which D is of the group consisting of H and lower alkyl radicals and from 50 to 98 percent by weight of a siloxane of the formula $$(CH_3)_dSiO_{\frac{4-d}{2}}$$

in which d has an average value from 1.75 to 2.1 inclusive.

7. A copolymer of from 2 to 50 percent by weight of siloxane of the unit formula $$HN\underset{\underset{O}{\overset{\|}{C}}}{\overset{CH_2-CH_2}{\diagdown\diagup}}N(CH_2)_3SiO_{3/2}$$

and 50 to 98 percent by weight of dimethylsiloxane.

8. A composition of matter consisting essentially of
(1) from 2.5 to 75 percent by weight of a siloxane consisting essentially of
 (A) a copolymer from 2 to 50 percent by weight siloxane units of the formula $$HN\underset{\underset{O}{\overset{\|}{C}}}{\overset{-Z-}{\diagdown\diagup}}NRSiO_{\frac{3-y}{4}}\overset{R'_y}{\underset{|}{}}$$

in which y has a value from 0 to 2 inclusive, R' is a lower alkyl radical, R is a divalent hydrocarbon radical of 3 to 18 inclusive carbon atoms which is free of aliphatic unsaturation and in which one N atom of the cyclic urea ring is attached to R through a nonaromatic carbon atom, and Z is a divalent hydrocarbon radical selected from the group consisting of $-CDHCDH-$ and $-CDHCDHCDH-$ in which D is selected from the group consisting of hydrogen and lower alkyl radicals and from 50 to 98 percent by weight of a siloxane of the unit formula $$(CH_3)_dSiO_{\frac{4-d}{2}}$$

in which d has an average value from 1.75 to 2.1 inclusive, and (B) at least 5 percent by weight based on the combined weights of (A) and (B) of $$(CH_3)_bH_cSiO_{\frac{4-b-c}{2}}$$

in which b has an average value from 1.75 to 2.1 inclusive and c has an average value from 0 to 1 inclusive, in (1) there being at least 2 percent by weight

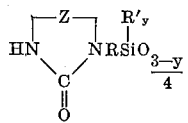

units based on the total weight of (A) and (B), and (2) from 25 to 97.5 percent by weight of a crease resistant resin selected from the group consisting of urea formaldehyde, alkylene urea formaldehyde, triazine formaldehyde, triazone formaldehyde and epoxide resins.

9. Method of treating a cellulosic fabric which comprises applying to said fabric a composition comprising a siloxane containing at least one siloxane unit of the formula

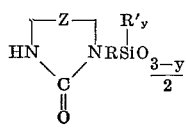

in which

Z is selected from the group consisting of —CDHCDH— and —CDHCDHCDH— radicals where D is selected from the group consisting of hydrogen and lower alkyl radicals, R is a divalent hydrocarbon radical of from 3 to 18 inclusive carbon atoms which is free of aliphatic unsaturation and in which one of the N atoms in the cyclic urea ring is connected to R through a non-aromatic carbon atom, R′ is a monovalent hydrocarbon radical of less than seven carbon atoms, and $y$ has an average value from 0 to 2 inclusive and thereafter heating said fabric to cure said siloxane.

10. The method in accordance with claim 9 in which the fabric is cotton.

References Cited by the Examiner

UNITED STATES PATENTS 2,906,756   9/56   Benneville et al. _____ 260—309.7

LEON J. BERCOVITZ, *Primary Examiner.*

DONALD E. CZAJA, *Examiner.*

UNITED STATES PATENT OFFICE
CERTIFICATE OF CORRECTION

Patent No. 3,209,053                              September 28, 1965

John W. Gilkey et al.

It is hereby certified that error appears in the above numbered patent requiring correction and that the said Letters Patent should read as corrected below.

Column 1, line 18, for "an" read -- on --; column 2, line 42, for "$NH_2ZNHSHi\equiv$" read -- $NH_2ZNHRSi\equiv$ --; column 9, Table I, sub-heading to column 4 thereof, for "3" read -- 2 --; column 12, lines 59 to 64, the formula should appear as shown below instead of as in the patent:

40% by weight 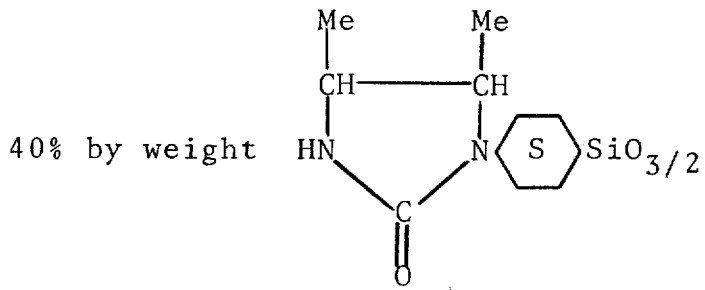

column 17, in the table at the bottom of the page, third column, the second formula should appear as shown below instead of as in the patent:

99 mol percent 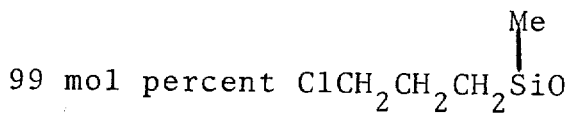

column 20, lines 21 to 24, the formula should appear as shown below instead of as in the patent:

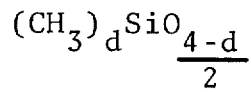

Signed and sealed this 25th day of October 1966.

(SEAL)
Attest:

ERNEST W. SWIDER                             EDWARD J. BRENNER
Attesting Officer                            Commissioner of Patents